April 4, 1967  F. WATHNE ET AL  3,312,011
ELECTRICAL TRAWL NET
Filed July 28, 1964
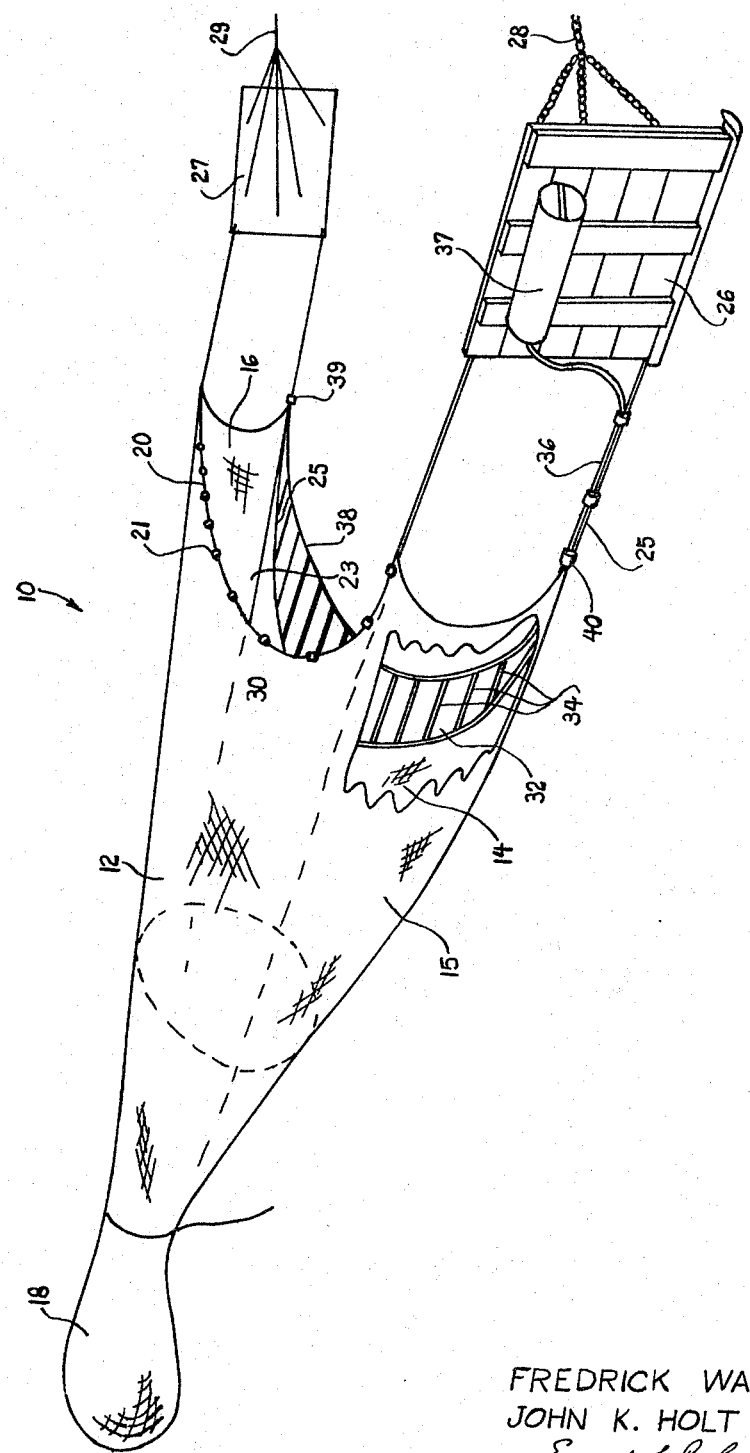
INVENTORS
FREDRICK WATHNE
JOHN K. HOLT
BY Ernest J Cohen
Gersten Sadowsky
ATTORNEYS

United States Patent Office 3,312,011
Patented Apr. 4, 1967

3,312,011
ELECTRICAL TRAWL NET
Fredrick Wathne and John K. Holt, Panama City, Fla., assignors to the United States of America as represented by the Secretary of the Interior
Filed July 28, 1964, Ser. No. 385,810
1 Claim. (Cl. 43—9)

The invention herein described and claimed may be manufactured and used by or for the Government of the United States of America for governmental purposes without the payment of royalties thereon or therefor.

This invention relates to improvements in aquatic gear used in fishing for marine organisms normally existing in or adjacent to sediment layers or substrata under water. More particularly the invention concerns trawl nets, of the type ordinarily dragged along the sea bottom, having electrical devices making them exceptionally suitable for gathering bottom dwelling creatures such as crustaceans and mollusks, as well as fish. These nets carry their electrical devices close to the underwater bottom where they create electrical fields, characterized by voltage gradients, which extend into and around such underwater bottom. As a result of this action, an extraneous stimulus is made to permeate a predetermined underwater area in front of the trawl net causing dislocation of the marine animals sought, whereby they move into the path of the front opening in the trawl net and are caught.

It has been shown that the application of low-level pulsed electrical fields, in the range of 0.4 volt, D.C., to underwater shrimp beds caused shrimp, 120 to 130 mm. in length, burrowed in the substrata to move rapidly out of their burrows and up into the water. Relatively low level electrical power proved to be effective in this procedure. However, shrimp oriented normal to the direction of the voltage gradient of an electrical field responded stronger than those parallel to the electrodes, and a pulse rate of below 4 per second produced stronger responses than a higher rate. Nevertheless, such factors as the pulse power, width or duration, and pulse repetition rate were modulated to achieve or involve a "blocking" or "scare" response in the shrimp rather than electronarcosis or electrotaxis. An array of electrodes, forming an integral part of the improved trawl net according to the invention, is admirably suited to produce the desired pulsing electrical fields for introduction to the underwater bottom. However, attempts to utilize such electrode arrays by towing them apart from the trawl as a separate component proved unsatisfactory. Handling the gear in the towed arrangement was difficult because the electrodes frequently tangled with each other. Moreover, avoiding the consequentially reduced mechanical and electrical efficiency required clearing the array after each tow, although whether the gear ever reached bottom in a cleared condition or, if it did, whether or not it remained cleared throughout the tow, was not easily determined. The present invention makes possible an electrical trawl net uniquely incorporating an electrode array generally free of handling problems, and which functions effectively both electrically and mechanically.

An object of the present invention is therefore to provide an electrical trawl net especially adapted to catch marine life along an underwater bottom.

A further object of the present invention is to provide a trawl net having an arrangement of electrodes operative upon an underwater bottom to cause marine animals embedded therein to come within the path of the net.

These and other objects of the invention will be more clearly understood from the following description of a preferred embodiment of the invention, considered together with the accompanying drawing presenting a perspective view, partly in section, of a trawl net incorporating the present invention.

Outwardly, the structure of the herein disclosed improved trawl net appears to conform broadly to that of one made according to a conventional design. As shown in the drawing, this sort of trawl net 10 has a generally wedge shaped top panel 12, and a similarly shaped bottom panel 14, both of which taper to the rear. Suitably contoured wing panels 15 and 16 join the top and bottom panel along their side edges and extend rearwardly therewith to terminate in a substantially cylindrical bag 18 constituting the cod-end of the trawl. In other forms, trawl nets not using wing panels have their top and bottom panels directly joined along side edges to form an elliptically-shaped front opening, and taper rearwardly for attachment to an opening in a cod-end. However, nearly all forms of such trawl structure have the forward edge of their top panel secured to a support line, called a headrope or cork-line, and the forward edge of their bottom panel secured to a support line called a footrope or leadline. A headrope 20, equipped with floats 21 spaced along an inner arcuate portion thereof, is shown in the drawing as stretching over a front opening 23 of trawl 10. A footrope 25 stretching along the lower arcuated edge of opening 23, is shown disposed substantially to the rear of headrope 20. The extended ends of headrope 20 and footrope 25 are connected to juncture panels or otter boards 26 and 27, in a conventional manner. Tow lines 28 and 29 join the otter boards to a towing vessel (not shown). For more complete descriptions of the structural features of a trawl net reference may be made to Patent No. 3,102,357, issued Sept. 3, 1963, to F. J. Luketa.

Situated under an overhang 30, formed by the expanse of upper panel 12 reaching rearwardly from headrope 20 to the part of the upper panel aligned above the bottom panel's forward edge, is an electrode array 32. Composing array 32 are a multiplicity of electrodes 34 to which are connected circuits supplying power to the electrodes by way of leads carried in a flexible cable 36 protectively covered with strong abrasion resistant material. A terminal section 38 of this cable is arranged in the plane of bottom panel 14, to follow the arcuate pattern of headrope 20 which, as may be seen in the drawing, is located above this cable section and in a substantial vertical alignment therewith. Two clamps 39 and 40 secure the extremities of cable section 38 to footrope 25, and additional fasteners retain cable 36 to an extension of the footrope leading to otter board 26. Secured to an outer surface at the upper part of otter board 26, is a sealed container housing a pulse generator and a battery power supply for energizing the electrodes. Cable 36 directs the leads from the electrode circuits to container 37 where the circuits are completed by their connections to the pulse generator.

Cable section 38 constitutes a conduit for the bundle of separate conductors which extend from the electrodes to the source of pulsating, electrical power in container 37. Electrical power is delivered to the individual electrodes 34 through soldered electrical connections joining the ends of the electrodes, which pass through the insulation material covering cable section 38, to the separate conductors therein. In an exemplary electrode array, $3/16$ inch copper wires 6 feet long, constituting the electrodes, extend out of cable section 38 and are tied to footrope 25 such that they are arranged 24 inches apart, substantially parallel to the longitudinal axis of the trawl net. As was hereinbefore explained, it is the purpose of such an array to distribute adequate electrical power for a sufficient length of time to effectively stimulate the shrimp encountered. Input power for the electrodes of between 60 to 80 peak volts produced at the output of the pulse generator provides a desired field strength wherein a minimum voltage drop of approximately 0.4 volt is achieved across a distance of 2 inches in the electrical fields pervading the areas between the electrodes. At this minimum or threshold voltage level, which provides a sufficient voltage drop in the electrical field to induce an involuntary contraction of the abdominal muscles of the shrimp, a pulse repetition rate of from 2 to 4 pulses a second is satisfactory. The pulse source in container 37 may be a conventional capacitor discharge type pulse generator capable of supplying, at the rate indicated, pulses of 60 to 80 volts, having 100 to 300 microsecond width and current peaks of 400 to 600 amperes. Described in Patent No. 3,043,041, granted July 10, 1962, to C. O. Kreutzer, is a generator having circuitry which with components suitably rated for supplying requisite outputs would have utility in a generator for the pulse source.

Utilization of the present invention in shrimp harvesting operations has been found to approximately double the yield normally obtained with conventional gear now used for this purpose. Daylight shrimping operation, normally unproductive because the shrimp are then burrowed deep into the underwater bottom, is made profitable by employing the present invention. Shrimp are caused to literally bound out of the bottom as the effect of the electrical field is applied thereto by the electrode array. Since the upper panel overhang and wing panels of the trawl net enclose the space immediately above the electrode array, shrimp caused to enter this space by the action of the electrical field are almost always brought within the immediate vicinity of the front opening of the trawl net whereby nearly all these shrimp are readily entrapped and consequently easily accumulated within the forwardly moving trawl net. It is evident that the improved gear according to the present invention can be operated with no more manpower or attention than is required with conventional trawl nets. Moreover, the fouling and consequent reduced effectiveness of the electrodes are eliminated by the integral construction characterizing the trawl net of the present invention.

While a preferred embodiment of the invention has been illustrated and described herein, it is to be understood that the invention is not limited thereby, but is susceptible of changes in form and detail.

What is claimed is:

A trawl net, operative upon underwater surfaces, comprising at its rear a bag from the open end of which forwardly extend elongated top and bottom panels joined along their corresponding side edges by separate wing panels, said bag and panels being constituted by a singular net that is substantially uniform throughout, and each said panel having a forward edge substantially wider than its back end at said bag, said bottom panel net being situated beneath substantially all but a short portion of said top panel net such that said top panel comprises a net overhang at its forward edge which extends in front of said bottom panel forward edge, individual line means attached to the respective forward edges of said top and bottom panels and adapted to operatively join said trawl net to a trawler vessel, electrical means fastened to said bottom panel forward edge line means, said electrical means comprising electrodes and electrical conductors connected to said electrodes, said electrical conductors constituting a cable extending between said bottom panel forward edge line means substantially vertically aligned with said forward edge of said top panel, wherefrom said electrodes are spacially arranged between said bottom panel forward edge and said cable so as to extend spaced apart and substantially parallel to each other such that said electrodes form an open array of parallel electrical conductors located beneath a canopy defined by said net of said top panel overhang and integral net portions of said wing panels adjacent thereto, and situated in the plane of said bottom panel net so as to facilitate placement of said array contiguous to said underwater surfaces, and a power source located apart from said electrical means including electrical connections to said cable completing circuits from said power source to said electrical conductors, whereby said electrodes are supplied with electrical power from said source such that they produce electrical fields in and around said underwater surfaces.

References Cited by the Examiner

UNITED STATES PATENTS

| 2,795,883 | 6/1957 | Ras | 43—17.1 X |
| 2,903,813 | 9/1959 | Gudjohnsen et al. | 43—9 |

FOREIGN PATENTS 699,346 11/1953 Great Britain.

SAMUEL KOREN, *Primary Examiner.*

W. H. CAMP, *Assistant Examiner.*